(12) United States Patent
Heinze et al.

(10) Patent No.: US 6,679,275 B2
(45) Date of Patent: Jan. 20, 2004

(54) VEHICLE WASHING INSTALLATION

(75) Inventors: Michael Heinze, Hemmingen (DE); Oliver Berger, Marbach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 16 days.

(21) Appl. No.: 10/178,499

(22) Filed: Jun. 24, 2002

(65) Prior Publication Data

US 2002/0162581 A1 Nov. 7, 2002

Related U.S. Application Data

(63) Continuation of application No. PCT/EP00/12999, filed on Dec. 20, 2000.

(30) Foreign Application Priority Data

Dec. 29, 1999 (DE) .......................................... 199 63 742

(51) Int. Cl.$^7$ ................................................. B08B 3/02
(52) U.S. Cl. ..................... 134/56 R; 134/58 R; 134/45; 134/123; 134/181; 134/198; 239/562; 239/264
(58) Field of Search ............................... 134/56 R, 57 R, 134/58 R, 45, 94.1, 95.1, 123, 181, 198; 239/550, 556, 557, 562, 563, 566, 225.1, 264

(56) References Cited

U.S. PATENT DOCUMENTS

| | | | | |
|---|---|---|---|---|
| 3,012,564 | A | * | 12/1961 | Dick |
| 3,038,481 | A | * | 6/1962 | Brechtel |
| 3,299,901 | A | * | 1/1967 | Axe et al. |
| 3,573,862 | A | * | 4/1971 | Brown |
| 3,650,281 | A | * | 3/1972 | Hurst |
| 3,658,590 | A | * | 4/1972 | Huebner et al. |
| 3,786,823 | A | * | 1/1974 | Wiley |
| 4,719,932 | A | * | 1/1988 | Burton |
| 4,809,720 | A | * | 3/1989 | Heraty |
| 4,933,016 | A | * | 6/1990 | Carlson |
| 4,957,126 | A |   | 9/1990 | Allaeys |
| 6,325,863 | B1 | * | 12/2001 | Zamensky et al. |
| 6,372,053 | B1 | * | 4/2002 | Belanger et al. |

FOREIGN PATENT DOCUMENTS

| | | |
|---|---|---|
| AT | 58740/86 | 12/1986 |
| DE | 37 23 978 | 2/1989 |
| EP | 0 379 353 | 7/1990 |
| EP | 0 507 757 | 10/1998 |
| JP | 2038170 | 2/1990 |

* cited by examiner

*Primary Examiner*—Frankie L. Stinson
(74) *Attorney, Agent, or Firm*—Barry R. Lipsitz

(57) ABSTRACT

In order to further develop a vehicle washing installation comprising at least one nozzle arrangement which is movable past a vehicle to be cleaned in the longitudinal and transverse directions thereof and is adapted to be supplied with a cleaning liquid for cleaning the vehicle, so that it is of structurally simpler design and is less susceptible to failure, it is proposed, in accordance with the invention, that the nozzle arrangement comprise at least two groups of nozzles, with a first group of nozzles facing the vehicle to be cleaned during a transverse movement of the nozzle arrangement and a second group of nozzles facing the vehicle to be cleaned during a longitudinal movement of the nozzle arrangement.

21 Claims, 6 Drawing Sheets

VEHICLE WASHING INSTALLATION

This application is a continuation of international application number PCT/EP00/12999 filed on Dec. 20, 2000.

The present disclosure relates to the subject matter disclosed in international application No. PCT/EP00/12999 of Dec. 20, 2000, which is incorporated herein by reference in its entirety and for all purposes.

This application claims the benefit of German Patent Application No. 199 63 742.3 filed Dec. 29, 1999.

BACKGROUND OF THE INVENTION

The invention relates to a vehicle washing installation comprising at least one nozzle arrangement which is movable past a vehicle to be cleaned in a longitudinal and a transverse direction of the vehicle and is adapted to be supplied with a cleaning liquid for cleaning the vehicle.

In a vehicle washing installation a vehicle is usually cleaned either by cleaning brushes touching the surface of the vehicle during the cleaning to remove dirt or in a non-contacting manner by a cleaning liquid being sprayed or sprinkled at high pressure onto the vehicle. A plurality of nozzle arrangements, which are oriented vertically and horizontally and surround the vehicle to be cleaned in the manner of a portal, are normally used for the last-mentioned cleaning operation. This enables the nozzle arrangements to be of rigid construction, and yet to act upon all the surfaces of the vehicle to be cleaned with a high-pressure jet.

Instead of using rigidly constructed nozzle arrangements, a vertical nozzle arrangement designed to travel around the vehicle to be cleaned is proposed in DE 37 24 978 A1. This nozzle arrangement is rotatable about a vertical axis, so that a high-pressure jet can be directed at the vehicle both during movement in a longitudinal direction and during movement in a transverse direction of the vehicle. The number of nozzle arrangements can be reduced by such a vehicle washing installation design, but the necessary rotatability of the nozzle arrangement around a vertical axis requires structurally elaborate mechanisms with a plurality of moving parts. This involves considerable manufacturing costs and results in a susceptibility of the vehicle washing installation to malfunction.

The object of the present invention is to further develop a vehicle washing installation of the kind mentioned at the outset so that it is of structurally simpler design and is less sensitive to failure.

SUMMARY OF THE INVENTION

This object is accomplished with a generic vehicle washing installation in accordance with the invention in that the nozzle arrangement comprises at least two groups of nozzles, with a first group of nozzles facing the vehicle to be cleaned during a transverse movement of the nozzle arrangement and a second group of nozzles facing the vehicle to be cleaned during a longitudinal movement of the nozzle arrangement. By using at least two groups of nozzles oriented in different directions, mechanisms for rotating the nozzle arrangement about a vertical axis can be dispensed with. It is merely necessary to supply the first group of nozzles with a cleaning liquid during a movement of the nozzle arrangement transversely to the vehicle to be cleaned, so that during a transverse movement a cleaning liquid can be sprayed or sprinkled onto the front or rear area of the vehicle by the first group of nozzles, and during a movement in the longitudinal direction of the vehicle the second group of nozzles is supplied with a cleaning liquid so that the vehicle can also be sprayed or sprinkled with cleaning liquid when the nozzle arrangement moves along a longitudinal side of the vehicle.

In order to reliably clean the vehicle along both of its longitudinal sides and also in the front and rear areas, provision may be made in accordance with the invention for use of two nozzle arrangements, which are each movable in a transverse and a longitudinal direction and each comprise two groups of nozzles oriented in different directions. This makes it possible to clean, for example, the front area and one longitudinal side of the vehicle with the two groups of nozzles of a first nozzle arrangement, and to clean the rear area and the other longitudinal side of the vehicle these can be sprayed or sprinkled with a cleaning liquid by the two groups of nozzles of the second nozzle arrangement.

In a particularly preferred embodiment of the vehicle washing installation according to the invention, provision is made for the nozzle arrangement to comprise three groups of nozzles with a first group of nozzles facing the vehicle during a transverse movement in front of the vehicle to be cleaned, a second group of nozzles facing the vehicle during a longitudinal movement along a longitudinal side of the vehicle, and a third group of nozzles facing the vehicle during a transverse movement behind the vehicle to be cleaned. With such a design, it is merely necessary to design a single nozzle arrangement so as to be movable in both a transverse and a longitudinal direction. In addition to a longitudinal side of the vehicle, both the front area and the rear area can be reliably cleaned with a single nozzle arrangement of such design. To do so, the front area of the vehicle can be sprayed or sprinkled with cleaning liquid by the first group of nozzles, a longitudinal side of the vehicle can be subsequently acted upon with cleaning liquid by the second group of nozzles of the nozzle arrangement, and the rear area of the vehicle can then also be reliably cleaned by the third group of nozzles of the nozzle arrangement. Afterwards an additional nozzle arrangement movable only in a longitudinal direction can be used for cleaning the remaining, second longitudinal side of the vehicle.

Provision may, of course, also be made for use of two nozzle arrangements, each designed to travel in a transverse and a longitudinal direction and each having three groups of nozzles, with, for example, approximately one half of the front area and of the rear area and, in addition, one longitudinal side of the vehicle being acted upon with cleaning liquid by each nozzle arrangement. In this case, it is particularly expedient for the ranges of movement of the two nozzle arrangements to overlap each other during their transverse movement in order to thereby reliably obtain particularly good cleaning results in the front and rear areas.

Alternatively, provision may also be made, for both the front and rear areas of the vehicle and the two longitudinal sides of the vehicle to be sprayed or sprinkled with cleaning liquid by a single nozzle arrangement by the nozzle arrangement comprising a total of four groups of nozzles, so that each longitudinal and transverse side of the vehicle can be acted upon with cleaning liquid by one group of nozzles without rotating the nozzle arrangement about a vertical axis.

It is particularly expedient for the nozzle arrangement to be movable at a predeterminable distance from the vehicle. This makes it possible to arrange the nozzle arrangement at such a distance from the respective longitudinal or transverse side of the vehicle to be cleaned that optimum cleaning results are obtainable when the vehicle is acted upon with cleaning liquid. This takes into account the consideration that when cleaning with high-pressure jets, too great a distance of the nozzle arrangement from the vehicle will seriously impair the cleaning results, whereas too short a distance will involve the risk of damage to the vehicle by a collision with the nozzle arrangement. Above all, attention must be paid to the risk of such a collision in the area of protruding vehicle parts such as, for example, rearview mirrors.

To position the nozzle arrangement at a predeterminable distance from the vehicle, it has proven advantageous for a sensor unit, for example, in the form of a light barrier to be associated with the nozzle arrangement. The light barrier may, for example, be in the form of a reflex sensor with adjustable background fade-out.

It is expedient for the nozzle arrangement and the sensor unit to be held on a transport unit, preferably a carriage, which is movable in a transverse direction. In this case, it is particularly advantageous for a drive unit associated with the nozzle arrangement to be held, in addition, on the transport unit for moving the nozzle arrangement in a transverse direction. Such a design can be implemented in a particularly compact manner, and traction rope connections which are mechanically complicated and susceptible to malfunction can be dispensed with by a drive unit of its own, for example, an electric motor, being associated with the nozzle arrangement for moving it in a transverse direction. The electric motor can be held together with the sensor unit and the nozzle arrangement on the transport unit. This produces a module-type design of the vehicle washing installation, which considerably simplifies assembly thereof.

To ensure that the nozzle arrangement is positionable at a predeterminable distance from the vehicle by means of the sensor unit, the sensor unit can be held at a distance from the nozzle arrangement on the transport unit and on touching the surface of the vehicle generate a stop signal for the drive unit, so that it is ensured that the nozzle arrangement will only approach the vehicle up to a minimum predeterminable distance therefrom. In this case, it is expedient for the vehicle washing installation to additionally comprise a storage and control device, so that the outer contour of the vehicle detected by the sensor unit during a complete run of the nozzle arrangement in a transverse and a longitudinal direction of the vehicle can be stored for subsequent cleaning operations. A corresponding running program can be derived from the stored values for the nozzle arrangement, so that during a second run of the nozzle arrangement, a detection of the vehicle by the sensor unit can be dispensed with. Those skilled in the art are familiar with such storage and control devices, which, therefore, need not be described herein in detail. Provision may also be made for the sensor unit to be used during a second run of the nozzle arrangement to check the position of the vehicle, so that any change in the position of the vehicle is reliably detected. This reduces the risk of damage to the vehicle even if the driver remaining in the vehicle erroneously changes the position of the vehicle during the cleaning.

In a preferred embodiment provision is made for a sensor arrangement to be associated with the nozzle arrangement for detecting the rear end of the vehicle. With such a sensor arrangement it can be ensured in a simple manner that when cleaning vehicles of different lengths, the nozzle arrangement will be at an optimum distance from the respective vehicle in the rear area thereof.

In this case, it is particularly advantageous for the sensor arrangement to comprise a light barrier oriented at an incline to the horizontal, i.e., light transmitter and light receiver are preferably arranged at different heights so that the rear end of the vehicle can be safely detected by the obliquely oriented beam of light irrespective of the vehicle design.

The sensor arrangement for detecting the rear end of the vehicle is preferably positioned behind the nozzle arrangement, in relation to the direction of movement of the nozzle arrangement along a longitudinal side of the vehicle in the direction towards the rear of the vehicle. This has the advantage that without any additional measures it can be ensured that the nozzle arrangement is at a defined distance from the rear of the vehicle when the rear of the vehicle is detected by the sensor arrangement.

It is of advantage for a transport device to be associated with the nozzle arrangement for moving the nozzle arrangement in a longitudinal direction of the vehicle. The transport device may, for example, be in the form of a transport carriage movable along a track, for example, a rail, with the transport device preferably having a drive of its own, for example, an electric motor. The drive of the transport device may be controlled in dependence upon a signal from the sensor arrangement for detecting the rear end of the vehicle.

A vehicle washing installation according to the invention with a structurally particularly simple design is achievable by the vehicle washing installation comprising a transport device, preferably arranged above the vehicle, at each of the two sides of the vehicle, with both transport devices being movable synchronously in a longitudinal direction and the two transport devices being connected to each other by a traverse beam on which the nozzle arrangement is displaceably mounted. Such a vehicle washing installation can be assembled in a short time. To do so, it is merely necessary to first mount the two transport devices so as to be displaceable in a longitudinal direction of the vehicle, for example, on one rail each. The two transport devices are then interconnected by the traverse beam which itself can accommodate, for example, a carriage on which the nozzle arrangement is held so as to be displaceable in a transverse and a longitudinal direction.

As explained above, it is particularly expedient for the vehicle washing installation to comprise in addition to the nozzle arrangement movable in both a transverse and a longitudinal direction a further nozzle arrangement which is movable in the direction of the length of the vehicle and has a group of nozzles facing the vehicle. This additional nozzle arrangement is preferably held on one of the two transport devices and can thus be moved by this in the longitudinal direction of the vehicle.

It is of advantage for at least one nozzle arrangement to be held on a nozzle carrying arm. The nozzle carrying arm may accommodate additional applicators for applying foam and/or a chemical cleaning agent to the vehicle to be cleaned. For example, provision may be made for the applicators at least on one nozzle carrying arm to comprise several spray nozzles oriented in different directions for spraying the vehicle with foam and/or a chemical cleaning agent. To perform the cleaning, the vehicle can, for example, first be sprayed with a chemical cleaning agent, foam can then be applied, and afterwards the vehicle can be sprayed or sprinkled with cleaning liquid at high pressure in order to thus obtain particularly good cleaning results.

In addition, devices may be provided for applying wax to the vehicle. These devices are preferably held on a transport device which is movable along the vehicle.

In an advantageous embodiment provision is made for the vehicle washing installation to comprise a blower for drying the vehicle and a flow channel which is in flow communication with the blower and opens in the direction towards the vehicle. In this case, in order to achieve a structurally simplified construction, it is advantageous for at least one nozzle arrangement to be held on the flow channel. With such a design, additional nozzle carrying arms can be dispensed with since the function of holding the nozzle arrangements is assumed by the flow channels.

In this case, it is advantageous for a mouth area of the flow channel directed at the vehicle to be movable at a predeterminable distance from the vehicle. This makes it possible to displace the mouth area in accordance with the contour of the vehicle so that the vehicle can, on the one hand, be washed by the nozzle arrangement held on the flow channel following the contour of the vehicle, and, on the other hand, dried by the blower communicating with the flow channel. In a structurally particularly simple embodiment, provision is made in this connection for the blower to be held together with the flow channel on the transport unit which is movable transversely to the vehicle.

To enable thorough cleaning of the roof and the hood in addition to the longitudinal sides and the front and rear areas of the vehicle, provision is made in a preferred embodiment of the vehicle washing installation according to the invention for this to comprise a nozzle beam which is adjustable in height and oriented transversely to the vehicle. A sensor arrangement for moving the nozzle beam at a predeterminable distance from the vehicle is preferably associated with the nozzle beam. In this case, it is expedient for the nozzle beam to be held on both transport devices so as to be adjustable in height.

The following description of a preferred embodiment of the invention serves in conjunction with the drawings to explain the invention in greater detail.

DETAILED DESCRIPTION OF THE INVENTION

Figure 1:
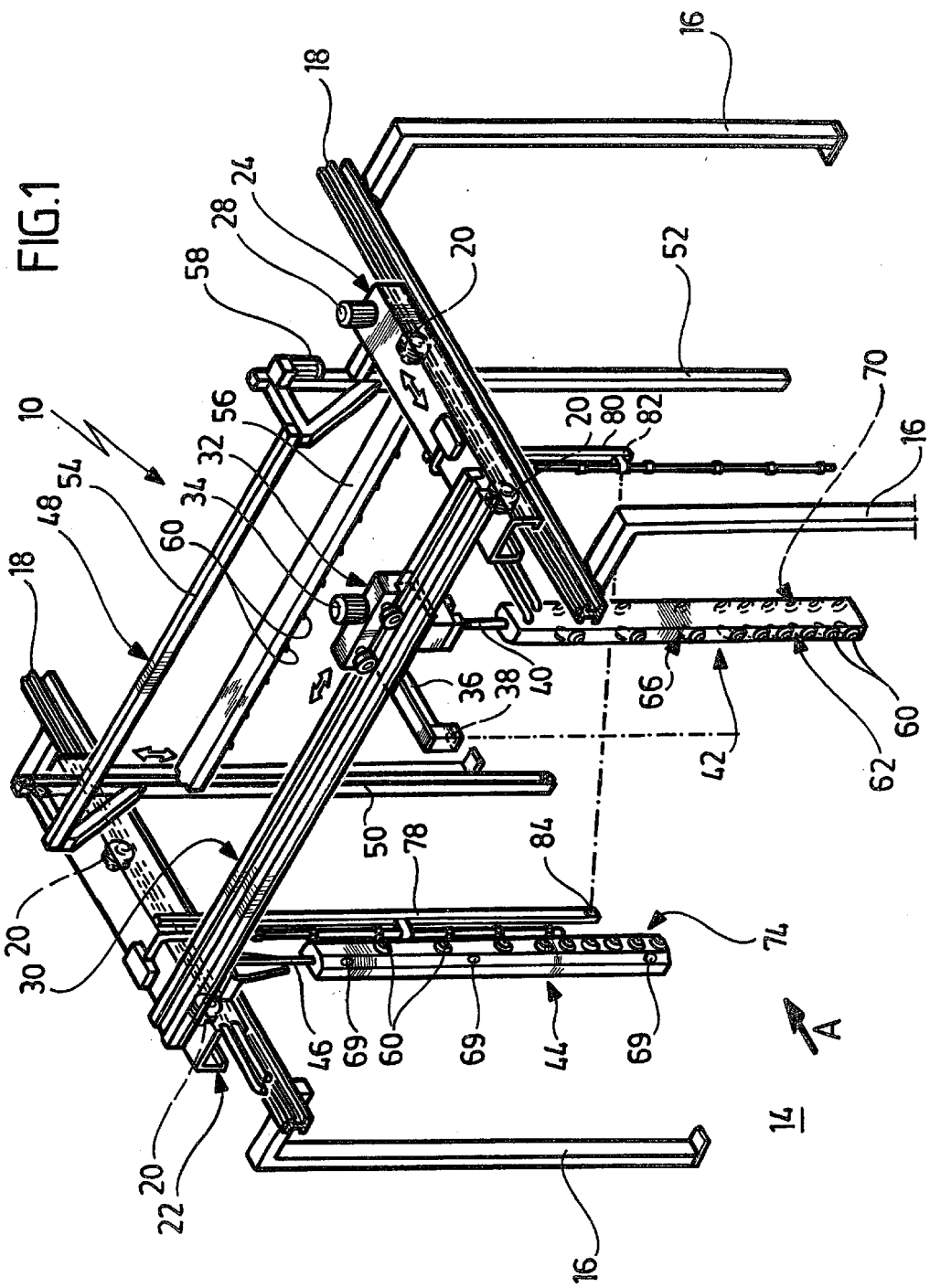
FIG. 1 is a perspective view of a vehicle washing installation.
Figure 2:
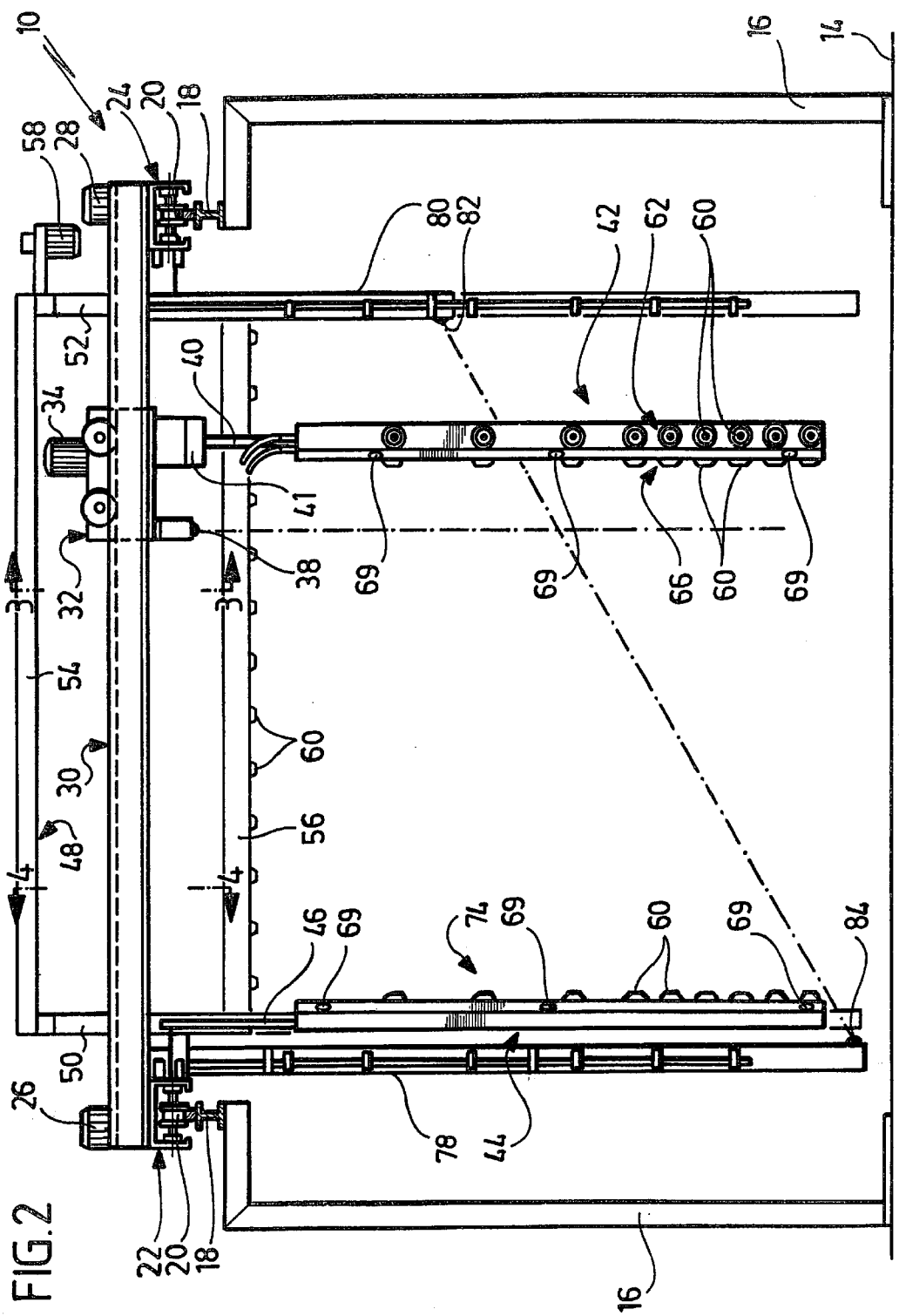
FIG. 2 is a view of the vehicle washing installation in the direction of arrow A from FIG. 1.
Figure 3:
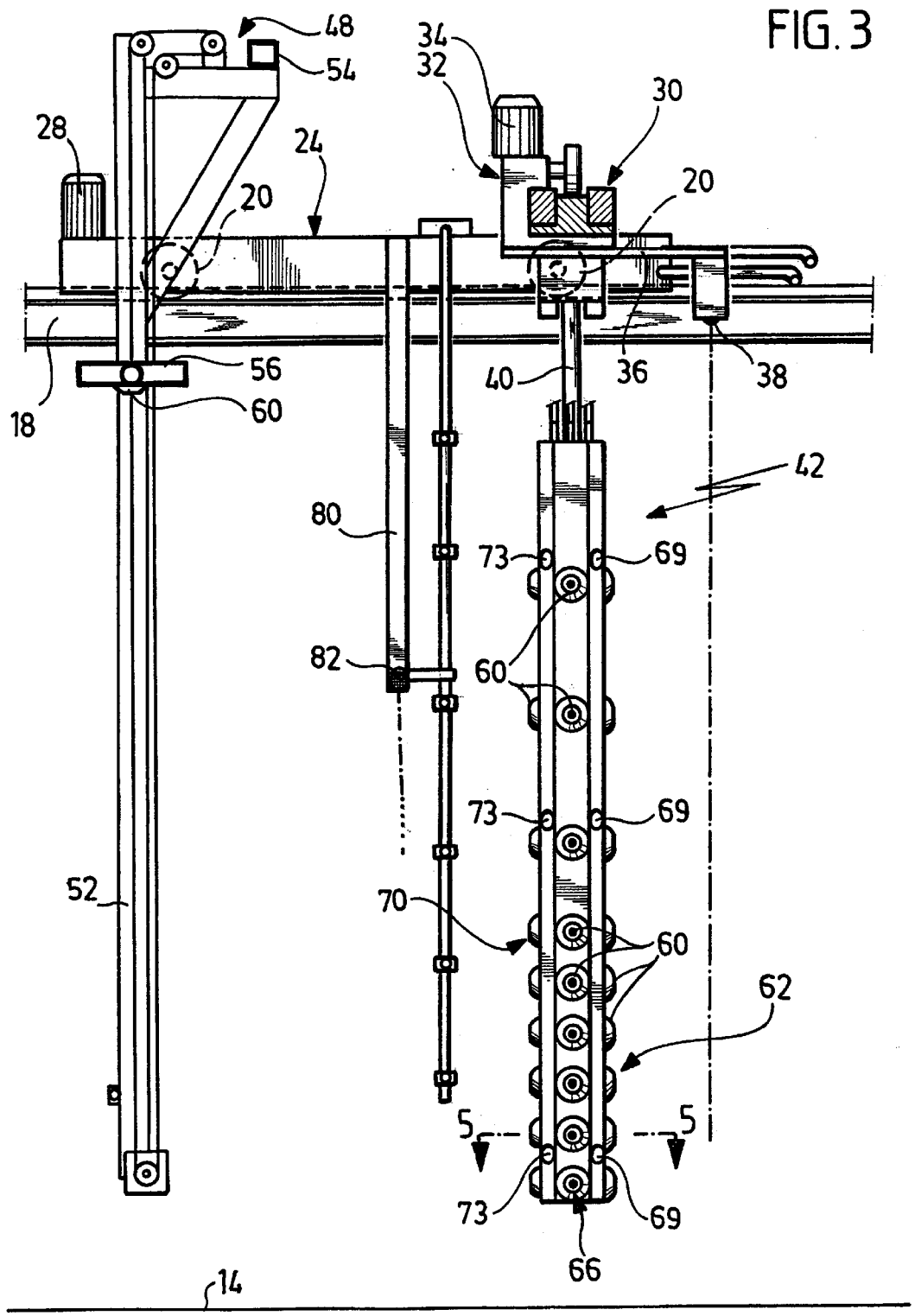
FIG. 3 is a view taken along line 3—3 in FIG. 2.
Figure 4:
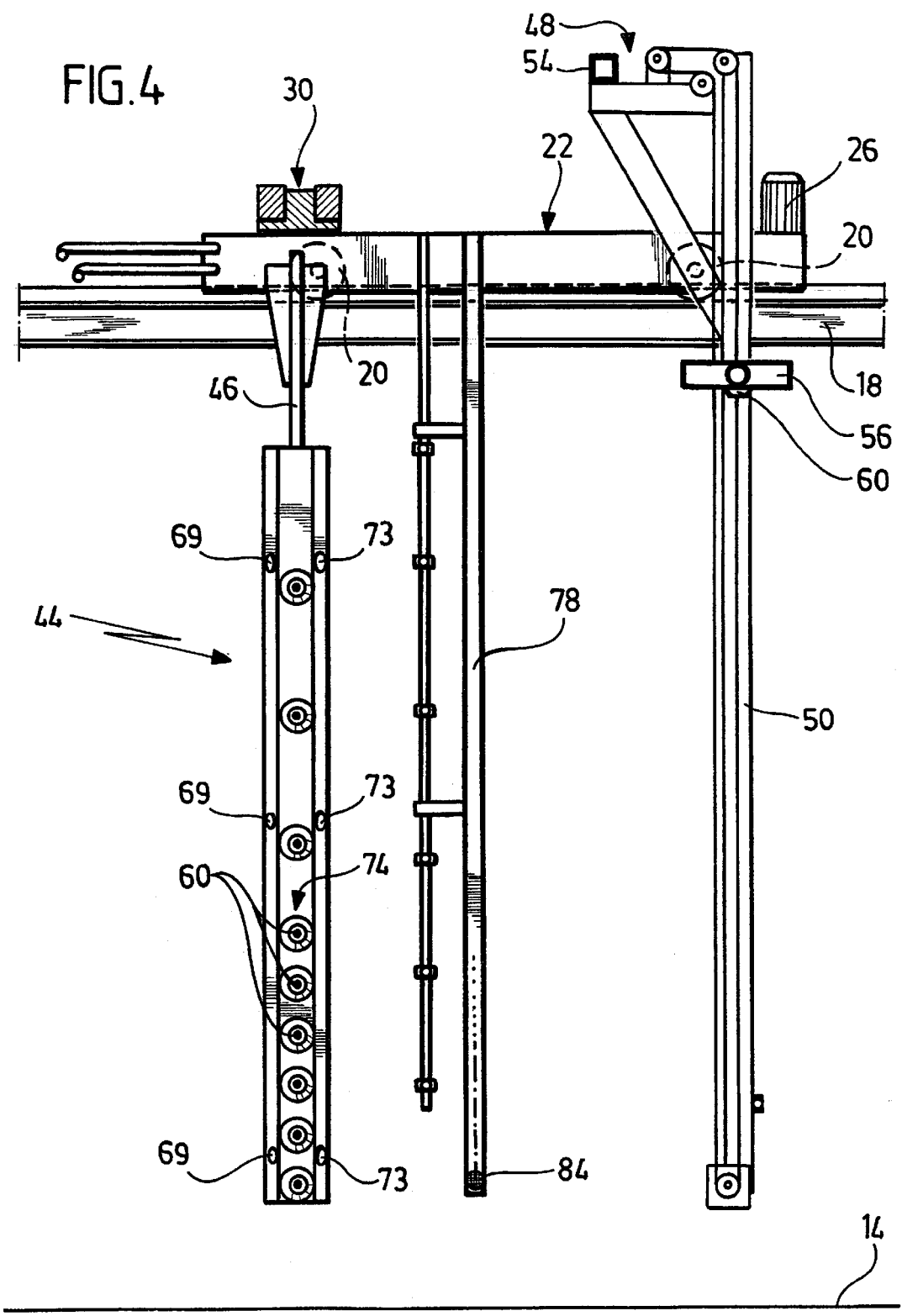
FIG. 4 is a view taken along line 4—4 in FIG. 2.
Figure 7:
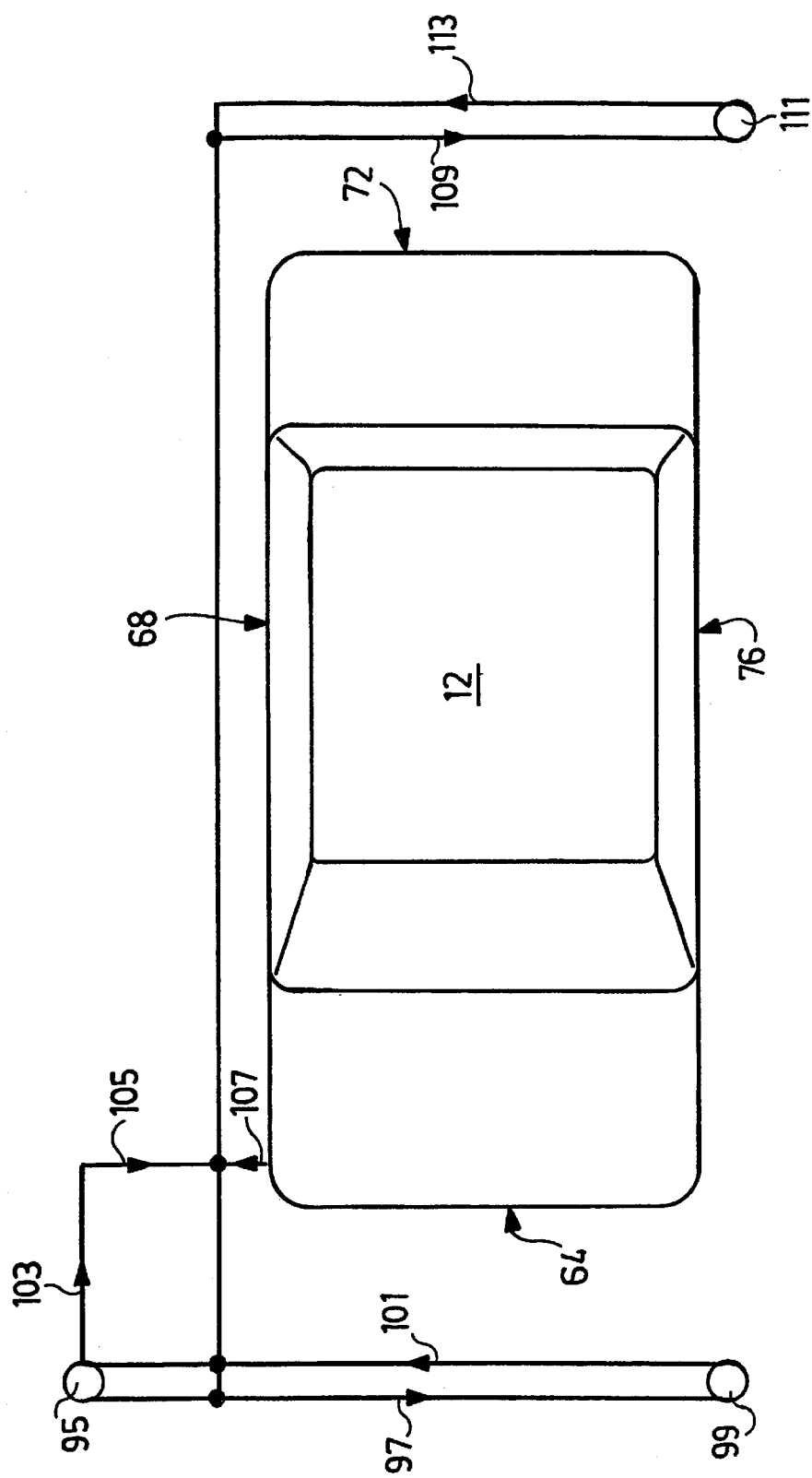
FIG. 7 is an illustration of the displacement path of a nozzle arrangement movable in a transverse and in a longitudinal direction of the vehicle when used in the vehicle washing installation.

The drawings show diagrammatically a vehicle washing installation generally designated by reference numeral 10 for cleaning a motor vehicle 12 outlined in FIG. 7, which is parked on a lane 14 after it has been driven in the direction of arrow A in FIG. 1 into a washing area of the vehicle washing installation 10.

As will be apparent, in particular, from FIG. 1, vertical supports 16 are arranged on both sides of the lane 14 and carry at their upper end above the motor vehicle 12 rails 18 extending along the lane 14. The length of the rails 18 is chosen so as to exceed the length of the motor vehicles 12 to be cleaned.

A transport carriage 22 and 24, respectively, is held so as to be movable on each rail 18 by means of transport wheels 20. The transport carriages 22 and 24 are displaceable along the rails 18. The displaceability is achieved by means of an electric drive 26 and 28, respectively, held on the respective transport carriage 22 and 24. The two electric drives 26, 28 can be synchronously controlled by means of a control device known per se which is not shown in the drawings. Alternatively, the displaceability of the transport carriages 22, 24 could be achieved by means of a cable drive. Those skilled in the art are familiar with such cable drives which are, therefore, not shown in the drawings.

The two transport carriages 22, 24 are interconnected by a traverse beam 30 on which a carriage 32 is mounted for displacement transversely to the longitudinal direction of the vehicle 12. The carriage 32 carries an electric motor 34 for driving it. An arm 36 arranged at the end area of the carriage 32 that faces the transport carriage 22 projects from the carriage 32 in a direction opposite to the direction of arrow A in FIG. 1 and carries at its free end a sensor 38 in the form of a reflex sensor.

At a distance from the arm 36, a nozzle carrying arm 40 is suspended from the carriage 32 in the area of the end thereof facing the transport carriage 24. The nozzle carrying arm 40 carries a nozzle arrangement 42 which is displaceable by means of the carriage 32 in a transverse direction and by means of the transport carriages 22 and 24, in addition, in a longitudinal direction of the vehicle 12 to be cleaned. The nozzle carrying arm 40 is held on the carriage 32 by an elastic element, in the illustrated embodiment in the form of a rubber buffer 41. This has the advantage that in the event of undesired contact with the surface of the vehicle, the nozzle carrying arm 40 can deviate elastically so that damage is kept at a low.

A further nozzle arrangement 44 is held on a nozzle carrying arm 46 which is rigidly connected to the transport carriage 22. This nozzle arrangement 44 can be displaced by means of the transport carriage 22 in the longitudinal direction of the vehicle 12 but there is no provision for displaceability of this nozzle arrangement 44 in the transverse direction. Instead of rigidly fixing the nozzle carrying arm 46 on the transport carriage 22, an elastic element, for example, a rubber buffer, may also be used for holding it thereon.

In addition to the traverse beam 30, the two transport carriages 22 and 24 accommodate between them a supporting portal 48 with two vertically oriented guide beams 50, 52 and a crossbeam 54 interconnecting the two guide beams 50, 52. A horizontally oriented nozzle beam 56 is mounted on the guide beams 50, 52 for displacement in a vertical direction and is driven by a motor 58 arranged at the upper end of the guide beam 52. Facing the lane 14, the nozzle beam 56 carries on its underside several high-pressure nozzles 60 arranged in spaced relation to one another. The high-pressure nozzles 60 can be supplied in a manner known per se and, therefore, not shown in the drawings with a cleaning liquid for spraying or sprinkling the roof of the motor vehicle 12 and its hood with the cleaning liquid. Associated with the nozzle beam 56 is a sensor arrangement known per se and, therefore, not shown in the drawings, so that the nozzle beam 56 is positionable at a predeterminable distance from the vehicle 12.

Further high-pressure nozzles 60 are provided for the nozzle arrangements 42 and 44. As will be apparent, in particular, from FIG. 5, the nozzle arrangement 42 movable in the transverse and longitudinal directions comprises a total of three groups of high-pressure nozzles 60 arranged in rows in a vertical direction, with a first nozzle group 62 oriented in the direction opposite to the direction of arrow A in FIG. 1 in the longitudinal direction of the vehicle 12, so that a front area 64 of the motor vehicle 12 can be sprayed or sprinkled with cleaning liquid by this first nozzle group 62 when the nozzle arrangement 42 is moved in the transverse direction. A second nozzle group 66 with high-pressure nozzles 60 arranged in a row in a vertical direction is offset through 90° in relation to the first nozzle group 62 so that a longitudinal side 68 of the motor vehicle 12 can be sprayed or sprinkled with cleaning liquid by the second nozzle group. A third nozzle group 70 of the nozzle arrangement 42 is offset through 180° in relation to the first nozzle group 62 and makes it possible to spray or sprinkle a rear area 72 of the motor vehicle 12 with cleaning liquid upon further movement of the nozzle arrangement 42 in the transverse direction. The first, second and third nozzle groups 62, 66 and 70, respectively, each comprise a plurality of high-pressure nozzles 60, whose mutual spacing decreases in the direction towards the lower free end of the nozzle arrangement 42. It is thereby ensured that the vehicle to be cleaned is sprayed or sprinkled with a large quantity of cleaning liquid, in particular, in the area thereof close to the lane 14, which, as a rule, is particularly heavily soiled.

The high-pressure nozzles 60 of the first, second and third nozzle groups 62, 66 and 70, respectively, of the nozzle arrangement 42 are each interconnected by a supply line 63, 67 and 71, respectively, via which the respective high-pressure nozzles 60 of the individual groups of nozzles can be selectively supplied with cleaning liquid.

Two rows of spray nozzles 69 and 73 arranged at an angle of 90° to each other are held on the nozzle carrying arm 40 in a circumferential direction between the first and second nozzle groups 62 and 66 and between the second and third nozzle groups 66 and 70. With the spray nozzles 69 and 73 a chemical cleaning agent can be sprayed onto the motor vehicle 12 for preliminary cleaning. This will be apparent, in particular, from FIG. 5. Corresponding spray nozzles 69, 73 are held on the nozzle carrying arm 46.

In contrast to the nozzle arrangement 42, the nozzle arrangement 44 is provided with only a single nozzle group 74 with several high-pressure nozzles 60 arranged in a row in a vertical direction and oriented transversely to the longitudinal direction of the lane 14 so as to face a longitudinal side 76 of the motor vehicle 12.

Between the traverse beam 30 and the supporting portal 48, a holder 78 and 80, respectively, protruding downwards in the direction towards the lane 14, is fixed on the transport carriage 22 and 24, respectively. The holder 78 arranged on the transport carriage 22 is longer than the holder 80 arranged on the transport carriage 24. A light transmitter 82 positioned at the free end of the holder 80 directs a beam of light in the direction towards a light receiver 84 arranged at the free end of the holder 78. In combination with the light receiver 84 the light transmitter 82 thus forms a light barrier oriented at an incline to the horizontal.

Figure 5:
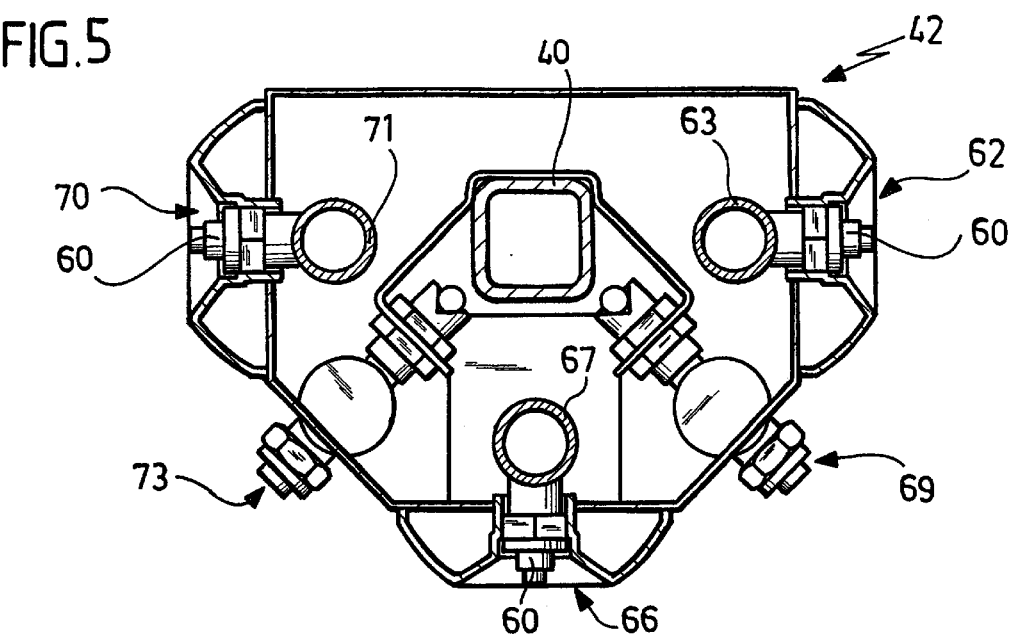
FIG. 5 is a sectional view of a nozzle arrangement taken along line 5—5 in FIG. 3.
Figure 6:
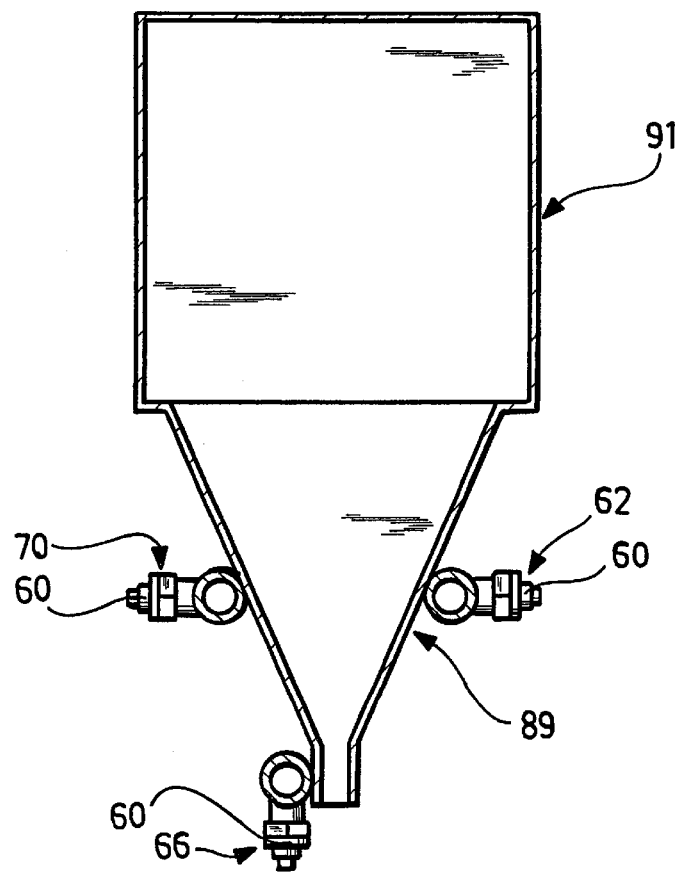
FIG. 6 is a sectional view corresponding to FIG. 5 of an alternative embodiment of a nozzle arrangement.

In the embodiment of the nozzle arrangement 42 shown in FIG. 5, the nozzle carrying arm 40 is used for holding the first, second and third nozzle groups 62, 66 and 70, respectively. Alternatively, as will be apparent from FIG. 6, provision may also be made for fixing of the first, second and third nozzle groups 62, 66 and 70, respectively, on a funnel-shaped mouth area 89 of a flow channel 91 which is in flow communication with a blower known per se, not shown in the drawings, to act upon the vehicle 12 with drying air at the end of the cleaning operation.

In accordance with the arrangement of the nozzle carrying arm 40, the flow channel 91 can be fixed on the carriage 32 which preferably carries, in addition, a blower for drying the vehicle. Thus, by means of the blower and the high-pressure nozzles 60 held on the flow channel 91, both the cleaning and the drying can be carried out following the course of the vehicle contour without additional sensors being required for positioning the flow channel. There can also be fixed on the transport carriage 22 a further blower which likewise communicates with a flow channel which is held in accordance with the nozzle carrying arm 46 on the transport carriage 22 and carries in its mouth area a single nozzle group corresponding to the nozzle group 74.

In accordance with the holder for the nozzle groups 62, 66, 70 and 74, respectively, the roof beam 56 may also be constructed in the form of a flow channel which is in flow communication with a blower and carries in its mouth area, in addition, high-pressure nozzles with which a cleaning liquid can be sprayed or sprinkled onto the roof, windshield and hood of the vehicle 12. These areas of the vehicle can thus also be cleaned and dried following the contour thereof.

Provision may be made for the roof beam 56 to carry two groups of high-pressure nozzles 60 oriented at an incline to each other and directed forwards at an incline and rearwards at an incline in the longitudinal direction of the vehicle (not shown). When the roof beam 56 is then guided over the vehicle, one of the two groups of high-pressure nozzles can be selectively supplied with cleaning liquid.

To clean the vehicle 12, it is positioned at a predetermined distance from a start position 95 of the nozzle arrangement 42 shown in FIG. 7. The distance may, for example, be 30 cm. In the illustrated embodiment, after starting a wash program the vehicle first undergoes a preliminary cleaning. To this end, the nozzle arrangement 42 displaceable in the transverse and longitudinal directions first moves transversely to the vehicle 12 in the direction of arrow 97 shown in FIG. 7 along the front 64 of the vehicle until it reaches a proximity or sensor switch 99 opposite the start position 95, which indicates that an end position is reached, and the nozzle arrangement 42 is then driven in the direction of arrow 101 along the traverse beam 30 back into the initial position 95.

In a following operational step the nozzle arrangement 42 is moved together with the nozzle arrangement 44 along a defined path of, for example, 30 cm parallel to the longitudinal side 68 of the motor vehicle 12 in the direction towards the vehicle by the two transport carriages 22, 24 being moved along the rails 18. The nozzle arrangement 42 is then moved transversely again in the direction of arrow 105 by means of the carriage 32 until the sensor 38 held on the arm 36 indicates that the longitudinal side 68 of the motor vehicle 12 has been reached. As a result, the carriage 32 is driven back again in the direction of arrow 107 by the control not shown in the drawings until the sensor 38 in the form of a light sensor is free again, and owing to the chosen length of the arm 36 it is ensured that the nozzle arrangement 42 will be at a predetermined distance from the longitudinal side 68 of the vehicle. The two nozzle arrangements 42 and 44 are then driven along the longitudinal sides of the vehicle by the transport carriages 22 and 24, respectively, until the light barrier in the form of the light transmitter 82 and the light receiver 84 indicates that the rear 72 of the vehicle has been reached. If during this travel in the longitudinal direction, the light sensor 38 is engaged by protruding parts of the vehicle (not shown), the distance of the nozzle arrangement 42 from the vehicle 12 is automatically increased until the light sensor 38 is free again. It is of advantage for the nozzle arrangement 42 to then be moved along a preferably predeterminable path of, for example, 10 cm at the increased distance from the vehicle, to then move transversely again in accordance with arrows 105 and 107. In this way it can be ascertained whether the protruding part of the vehicle is a short part in relation to the longitudinal direction of the vehicle, for example, a rearview mirror, so that after passing this, the nozzle arrangement 42 can be advanced in the direction towards the vehicle again, or whether the contour of the vehicle as a whole has increased in width. In this way a collision between the nozzle arrangement 42 and the vehicle 12 is reliably prevented, and yet an optimum distance of the nozzle arrangement 42 from the vehicle 12 is maintained.

When the rear of the vehicle is detected, the travel of the nozzle arrangements 42 and 44 in the longitudinal direction is stopped, and the electric motor 34 is then actuated again to move the nozzle arrangement 42 along the traverse beam 30 so that the nozzle arrangement 42 can be driven along the rear 72 of the vehicle in the direction of arrow 109 transversely to the motor vehicle 12 until actuation of a proximity switch 111 indicates that an end position has been reached, and the nozzle arrangement 42 is then driven in the direction of arrow 113 along the rear 72 of the vehicle towards the side again. Owing to the chosen distance between the light barrier 82, 84 detecting the rear of the vehicle and the nozzle arrangement 42 it is ensured that when moving transversely behind the vehicle 12, the nozzle arrangement 42 will be at a predeterminable distance from the vehicle 12.

After the nozzle arrangement 42 has moved back and forth in the rear area of the vehicle, the two transport carriages 22 and 24 are moved back along the longitudinal sides of the vehicles into their original position, so that the nozzle arrangement 42 can commence a new cleaning run from its start position 95, arrival at which can likewise be indicated by a proximity switch. The vehicle washing installation 10 comprises, in addition, a memory device, known per se and, therefore, not shown in the drawings, for storing the displacement path of the nozzle arrangement 42, so that it can be subsequently positioned in accordance with the first displacement path for a further washing operation without the sensors described hereinabove having to be used for this purpose.

As the nozzle arrangement 42 carries three different groups of nozzles which can be alternatively supplied with cleaning liquid, a separate group of high-pressure nozzles 60 can be used respectively for the transverse movement at the level of the front 64 of the vehicle, for the subsequent lengthwise movement along the longitudinal side 68 of the vehicle and for the transverse movement at the level of the rear 72 of the vehicle, for spraying or sprinkling the respective surface of the vehicle with cleaning liquid. During travel along the longitudinal side 68 of the vehicle, the nozzle group 74 of the nozzle arrangement 44 is used additionally for spraying or sprinkling the longitudinal side 76 of the vehicle opposite the longitudinal side 68 of the vehicle. The vehicle washing installation 10 thus enables reliable cleaning of the motor vehicle 12, and, in particular, motor vehicles 12 of different widths and different lengths can be sprayed or sprinkled with cleaning liquid at a respective optimum distance from the surface of the vehicle.

What is claimed is:

1. Vehicle washing installation comprising at least one nozzle arrangement which is movable past a vehicle to be cleaned in a longitudinal and a transverse direction of said vehicle and is adapted to be supplied with cleaning liquid for cleaning said vehicle, wherein said nozzle arrangement comprises at least two groups of nozzles, with a first group of nozzles facing said vehicle to be cleaned during a transverse movement of said nozzle arrangement and a second group of nozzles facing said vehicle to be cleaned during a longitudinal movement of said nozzle arrangement.

2. Vehicle washing installation in accordance with claim 1, wherein said nozzle arrangement comprises three groups of nozzles, with a first group of nozzles facing said vehicle during a transverse movement in front of said vehicle to be cleaned, a second group of nozzles facing said vehicle during a longitudinal movement along a longitudinal side of said vehicle, and a third group of nozzles facing said vehicle during a transverse movement behind said vehicle to be cleaned.

3. Vehicle washing installation in accordance with claim 1, wherein said nozzle arrangement is movable at a predeterminable distance from said vehicle.

4. Vehicle washing installation in accordance with claim 1, wherein a sensor unit is associated with said nozzle arrangement for controlling said nozzle arrangement during a longitudinal movement.

5. Vehicle washing installation in accordance with claim 4, wherein said nozzle arrangement and said sensor unit are held on a transport unit which is movable in a transverse direction.

6. Vehicle washing installation in accordance with claim 5, wherein a drive unit arranged on said transport unit is associated with said nozzle arrangement for moving said nozzle arrangement in a transverse direction.

7. Vehicle washing installation in accordance with claim 1, wherein a sensor arrangement is associated with said nozzle arrangement for detecting the rear end of said vehicle.

8. Vehicle washing installation in accordance with claim 7, wherein said sensor arrangement comprises a light barrier oriented at an incline to the horizontal.

9. Vehicle washing installation in accordance with claim 1, wherein a transport device is associated with said nozzle arrangement for moving said nozzle arrangement in a longitudinal direction.

10. Vehicle washing installation in accordance with claim 1, wherein said vehicle washing installation comprises a transport device at each of the two sides of said vehicle, both of said transport devices being movable synchronously in a longitudinal direction and being connected to each other by a traverse beam on which said nozzle arrangement is displaceably mounted.

11. Vehicle washing installation in accordance with claim 1, wherein said vehicle washing installation comprises a further nozzle arrangement which is movable along said vehicle and comprises a group of nozzles facing said vehicle.

12. Vehicle washing installation in accordance with claim 1, wherein at least one nozzle arrangement is held on a nozzle carrying arm.

13. Vehicle washing installation in accordance with claim 12, wherein additional applicators are held at least on one nozzle carrying arm for applying foam and/or a chemical cleaning agent to said vehicle to be cleaned.

14. Vehicle washing installation in accordance with claim 13, wherein at least on one nozzle carrying arm said applicators comprise several spray nozzles oriented in different directions.

15. Vehicle washing installation in accordance with claim 1, wherein said vehicle washing installation comprises a blower for drying said vehicle, and a flow channel coupled with said blower and opening in the direction towards said vehicle, and a nozzle arrangement is held on said flow channel.

16. Vehicle washing installation in accordance with claim 15, wherein at least one mouth area of said flow channel is movable at a predeterminable distance from said vehicle.

17. Vehicle washing installation in accordance with claim 16, wherein said flow channel is held on said transport unit which is movable in a transverse direction.

18. Vehicle washing installation in accordance with claim 17, wherein said blower is held on said transport unit.

19. Vehicle washing installation in accordance with claim 1, wherein said vehicle washing installation comprises a nozzle beam adjustable in height and oriented transversely to said vehicle.

20. Vehicle washing installation in accordance with claim 19, wherein a sensor arrangement is associated with said nozzle beam for moving said nozzle beam at a predeterminable distance from said vehicle.

21. Vehicle washing installation in accordance with claim 19, wherein said nozzle beam is held on both of said transport devices so as to be adjustable in height.

* * * * *